INVENTOR
W. B. GAUNT, JR.
BY
R. C. Winter
ATTORNEY

United States Patent Office 3,202,763

Patented Aug. 24, 1965

3,202,763

RESONANT TRANSFER TIME DIVISION MULTIPLEX SYSTEM UTILIZING NEGATIVE IMPEDANCE AMPLIFICATION MEANS

Wilmer B. Gaunt, Jr., Lincroft, N.J., assignor to Bell Telephone Laboratories, Incorporated, New York, N.Y., a corporation of New York Filed Aug. 16, 1963, Ser. No. 302,576
1 Claim. (Cl. 179—15)

This invention relates to electrical transmission circuits and, more particularly, to transmission circuits including gating and filter networks applicable to information processing and transfer. This application is a continuation-in-part of W. B. Gaunt, Jr., application Serial No. 204,932, filed June 25, 1962, and now abandoned.

A practice receiving widespread attention in high speed information-handling systems is the time-sharing of a common communication channel among a plurality of information sources communicating in pairs. Time-sharing or time division multiplexing requires that in successive, short time intervals each pair of information sources or terminals in communication be assigned a frequently recurring discrete interval of time or time slot during which information may be interchanged via the common channel. Intermediate the cyclic appearances of a time slot assigned to a particular pair of terminals, the common channel is available to other communicating pairs of terminals in their respective preassigned time slots.

Time-sharing may be utilized, for example, in a telephone system wherein connection of a plurality of communicating pairs of telephone lines is implemented via a common communication channel, thereby realizing a substantial reduction in expensive transmission facilities. A system of this type is described, for example, in D. B. James et al. Patent 2,957,949, issued October 25, 1960.

The accurate reproduction of cyclically sampled information transmitted over a common channel between a plurality of communicating pairs of terminals depends upon strict minimization of signal losses in transfer as well as sampling at a prescribed rate. Among the factors tending to produce losses in such a system is the impedance of the gating circuits which periodically connect the lines to the common channel. Such impedances, while usually low, are magnified by the time-sharing process, and thus present a severe impedance mismatch problem upon line interconnection. The resulting interference with the voice samples being transferred through the common channel may be sufficient to affect the intelligibility of a telephone conversation.

The sampling technique utilized in the aforementioned James et al. patent is based upon a principle referred to as "resonant transfer," a circuit for the operation of which is disclosed in W. D. Lewis Patent 2,936,337, issued May 10, 1960. Operation in accordance with this principle permits sampling of the information at a particular terminal by operation of a gate intermediate the terminal and the common channel during a discrete time slot of a repetitive cycle of time slots. The length of time that the gate remains operated is established by the time required for transfer of an information sample through the gate from one storage condenser to a second storage condenser in a circuit including an inductive element in series with the storage condensers and gate. After one half-cycle at the resonant frequency of the tuned circuit formed by these elements, transfer of the information sample is complete, and before any retransfer of the sample through the gate can be effected, the gate circuit is disabled.

Theoretically, resonant transfer is accomplished without loss. However, considering the loss encountered in each line gate and the stray capacitance present in the common channel, imperfect signal transfer is the practical result.

The line gates proposed for use in the James et al. system are arranged for bilateral transmission in an unbalanced network. Such gates are effective in reducing leakage losses to a minimum. Nevertheless a finite impedance is encountered in transfer, producing the losses indicated heretofore. Also the distinct impedance of each of the numerous gates connected to the common channel in pairs in each discrete time interval aggravates the impedance mismatch problem.

It is a general object of this invention to provide an improved signal transfer circuit.

More specifically, it is an object of this invention to provide an improved time division switching system capable of transferring information between pairs of terminals over a common communication channel.

It is another object of this invention to provide an unbalanced transmission system with an improved signal transfer circuit.

It is a further object of this invention to provide an efficient, economical and reliable transmission system in a time division switching system.

More specifically, it is an object of this invention to eliminate signal transfer losses in a time division switching system.

These and other objects of this invention are attained in one specific illustrative embodiment wherein a time division switching system of the type described in the aforementioned application of D. B. James et al. comprises a line gate individual to each circuit, each line gate serving to connect storage means in the corresponding line circuit to a common communication channel during a selected, cyclically recurring time interval.

The storage means in each line circuit comprises capacitance means, and, upon concurrent enablement of the line gates for a pair of lines in communication, a series circuit is completed through the common channel including the storage capacitance of each line and inductance means. The line gates are enabled for a period equivalent to one half-cycle at the resonant frequency of the series circuit such that a resonant transfer of signals stored in the respective shunt capacitances is effected.

The timing of the gate operation in this system is arranged such that a pair of gates corresponding to lines in communication are operated simultaneously to effect an interchange of information therebetween. Upon completion of such transfer, the signals for operation of the pair of line gates are removed, and any signal remaining in the common channel is removed by a clamping operation. Thereafter, the next communicating pair of line circuits have their respective line gates enabled.

The common channel comprises negative impedance conversion means connected in series, in shunt to ground, or a combination of the two, and having an impedance value which is greater than the sum of the impedances encountered in a pair of interconnected line gates. This negative impedance value, if not counteracted, can result in oscillation within the resonant transfer circuit including the pair of interconnected line gates. Voice frequency signals introduced into this regenerative system would modulate or be superimposed upon such oscillations. Notwithstanding, the voice frequency signals experience no loss in transfer from one line circuit to the other.

It is possible to consider the operation of my inventive circuit in different ways. Thus one can consider that oscillations are, in fact, produced in the resonant transfer circuit but are filtered out by the filters in the line circuit. However, one can also consider that the specific filters, in accordance with another aspect of my invention, completely suppress the tendency of the resonant transfer circuit to develop the oscillatory mode.

My invention is, of course, not to be considered limited by either mode of explanation or theory. In either event the oscillations due to the presence of the negative impedance converter in the resonant transfer circuit, in accordance with my invention, are suppressed by the filter circuits.

Thus it may be seen that the unique combination, including a negative impedance converter in the common channel and filter structures to remove the oscillations that tend to be caused by the negative impedance converter, provides virtually lossless signal transfer without distortion through a communication system operating on a time division basis.

It is a feature of this invention that the common communication channel interconnecting pairs of active lines in a time division communication system comprises means for obtaining lossless signal transfer between the interconnected lines.

It is another feature of this invention that the means in the common communication channel tends to establish oscillations in the resonant transfer circuit formed by the activation of a pair of line gates.

It is a further feature of this invention that the means in the common communication channel comprises a negative impedance converter.

It is a still further feature of this invention that the negative impedance has a value greater than the sum of the impedances produced by any two simultaneously activated line gates.

It is yet another feature of this invention that negative impedance conversion means is connected in series in the common communication channel and/or in shunt between the common communication channel and ground.

It is yet another feature of this invention that a distinct filter arrangement be provided in the line circuit to suppress the tendency of the negative impedance converter to produce the oscillatory mode in the resonant transfer circuit.

A complete understanding of these and other features of the invention may be gained from consideration of the following detailed description, together with the accompanying drawing, in which.

Figure 1:
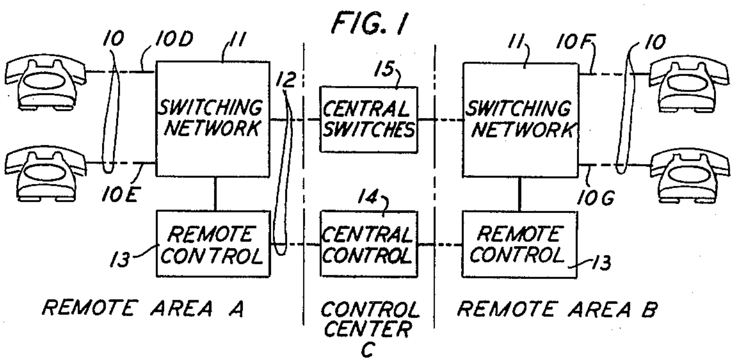
FIG. 1 is a schematic representation in block diagram form of the time division switching network in a telephone system in which the arrangement in accordance with this invention may be employed.
Figure 3A:
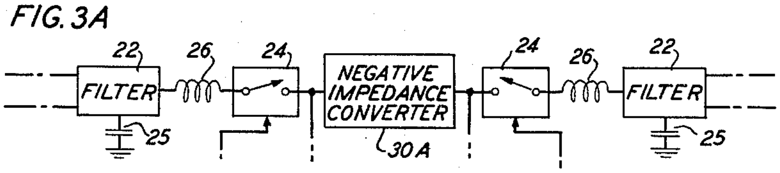
Figures 3B, 3C, 4A, 4B:
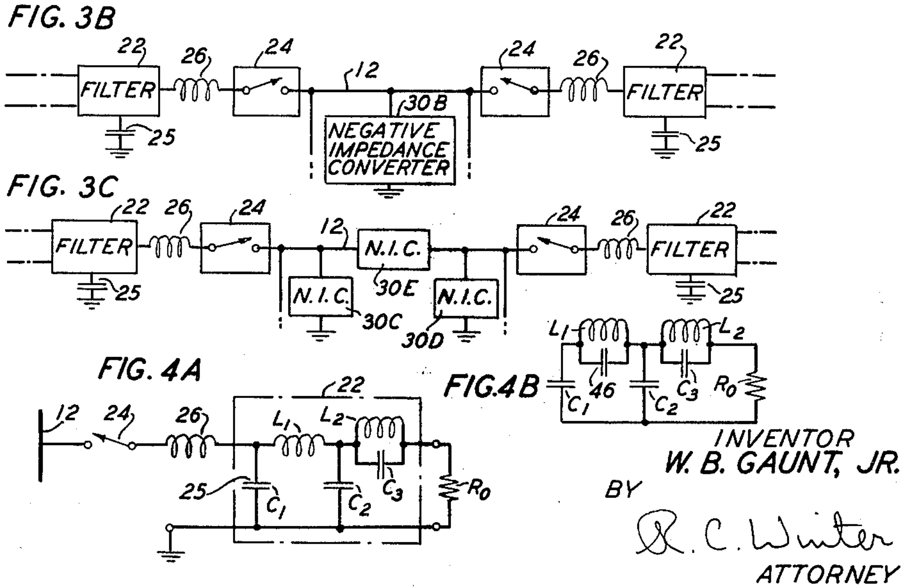

FIGS. 3A, 3B, and 3C are schematic representations of the time division switching and resonant transfer arrangement in accordance with specific embodiments of my invention and which may be employed in the telephone system of FIG. 1; and FIGS. 4A and 4B are schematic representations of filter circuits in accordance with my invention and which may be employed in the arrangements of FIGS. 3A, 3B, and 3C.

Turning now to the drawing, the basic elements of a time division communication system in which my invention may be incorporated are depicted in FIG. 1. This system, particularly adapted to telephone communication, is disclosed in the aforementioned James et al. patent. As shown therein, a plurality of subscriber lines 10 grouped in proximity in a plurality of remote areas are selectively connected by a switching network 11 to a control center comprising control apparatus 14 and switching apparatus 15 over common communication channel 12. The equipment in the central control 14 is operated, for example, in accordance with signals from a calling line 10D in remote area A to complete a connection through the central switches 15 to a called line 10F in remote area B or through its own switching network 11 to a called line 10E in remote area A.

The system is operated on a time division multiplex basis in which each line 10 desiring service is assigned a time slot in a recurrent cycle of time slots. Upon each occurrence of the time slot assigned to a particular calling line, such as 10D, a sample of information is transferred from that line through the switching network 11 to the common channel 12 and through the same or a similar switching network 11 to the called line 10E or 10F, respectively.

Information as to the condition of a line 10; e.g., idle, busy on an established connection, or desiring to have a connection established to it, is obtained by the remote control 13 connected between the remote switching network 11 and the central control 14 by a control lead of the common channel 12. The remote control 13 serves to transmit control signals to selected line gates in the switching network 11 upon receipt of directive signals from the central control 14. The resultant connections and disconnections of the line gates occur in a selected sequence for precisely timed intervals during which signal samples are transferred between the lines 10 via the common channel 12.

A particular control operation which permits service between lines in the same remote area without requiring transmission of the information samples through the control center is disclosed in an application of R. C. Gebhardt et al. Serial No. 195,199, filed May 16, 1962. The circuit according to my invention advantageously may be incorporated in such a system.

Figure 2:
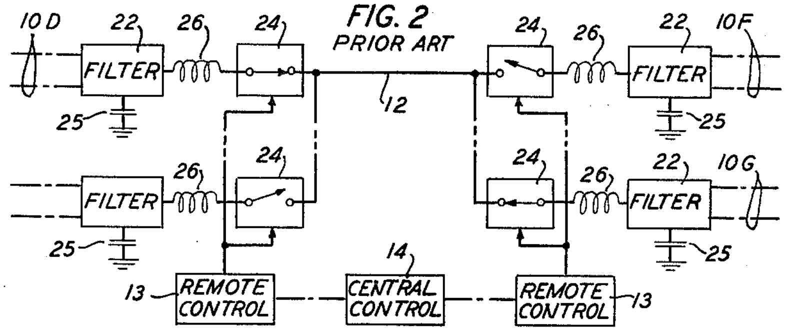
FIG. 2 PRIOR ART
FIG. 2 is a schematic representation of a time division switching and resonant transfer arrangement as known in the art.

FIG. 2 illustrates a talking path established between lines 10D and 10G and the potential path between 10E and 10F, considering this to be the connection established in the next time slot in the recurring cycle of time slots. The James et al. system includes additional gating circuitry in the common channel 12 which is omitted for this disclosure in that it has no bearing on the novel subject matter here involved. Suffice it to say, therefore, that when a connection is completed in a given time slot between an active pair of lines, in essence the circuit is as illustrated in FIG. 2. Such a circuit comprises the now familiar resonant transfer operation disclosed in the aforementioned W. D. Lewis patent. Lines 10D and 10G are connected to the common channel 12 by the line gates 24 in each of the selected line circuits during a distinct time interval. A signal sample from line 10D stored in the grounded line storage capacitance 25 at the output of the filter 22 is then transferred through a resonant transfer inductance 26, the associated active line gate 24 and the common channel 12 to the capacitance 25 in the other active line 10G. The grounded line storage capacitance 25 provides a return path for the signals transmitted over the unbalanced common channel 12.

The transfer operation requires that the gates 24 be disabled after sufficient time has elapsed for a complete transfer of stored energy from one line storage capacitance to the other. This time interval is equivalent to one half-cycle at the resonant frequency of the tuned circuit including the grounded line storage capacitance 25, inductance 26, gates 24 and common channel 12.

The gating circuit 24 according to the James et al. patent and the Gebhardt et al. application comprises elements connected to provide bilateral transmission upon receipt of an enabling signal; while the gating circuits 24 have been depicted in the drawing schematically as switches, it is to be understood that they are electronic gates operated by enabling signals in particular time slots as determined by the central control 14. More specifically, the gates may be of the type disclosed in J. D. Johannesen et al. Patent 2,899,570, issued August 11, 1959. Theoretically, the line gates display an infinite impedance to the transfer of signals when in the disabled state and zero impedance when in the enabled state. Such gate conditions, coupled with a theoretical lossless resonant transfer operation, are not fully realized in practice, due in part to imperfect gates. The loss produced by this source may be sufficient in systems involving a large number of lines to cause noticeable signal distortion.

FIGS. 3A, 3B, and 3C depict time division switching and resonant transfer arrangements in accordance with my invention, which arrangements serve to overcome the effects of losses encountered in prior art arrangements. The circuits are identical to that disclosed in FIG. 2, with the exception of a negative impedance converter 30 added to the common communication channel 12. As illustrated in FIG. 3A, converter 30A may be added in series or, optionally, as illustrated in FIG. 3B, converter 30B may be added in shunt between the common channel 12 and ground. Combinations of series and shunt connected converter elements also may be utilized to satisfy particular design requirements. For example, as illustrated in FIG. 3C, a pair of converters 30C and 30D advantageously may be connected to the common channel 12 in shunt to ground at opposite ends of a third converter 30E in series in the channel.

Negative impedance converters are familiar to the art, having been employed in a variety of forms for the reduction of parasitic losses, for the improvement of device characteristics, and for the design of circuits impossible with purely passive elements. In the telephone plant, negative impedance repeaters have been employed to reduce the loss on telephone lines, as disclosed for example by J. L. Merrill in the Bell System Technical Journal, volume 30, pages 88–109, January 1951; more recently transistorized negative impedance converters have been designed, as exemplified by an article "Transistor Negative-Impedance Converters" by J. G. Linvill, Proceedings of the I.R.E., June 1953, page 725. Simply stated, a negative impedance converter is an element which converts a given impedance to a different value in the operating circuit. Typically, such converters in prior art transmission circuits serve to balance out a fixed value impedance at given signal frequencies and suppress oscillations or singing in the line.

Thus a variety of negative impedance converters are available for reduction of the transmission loss occurring in the instant network. Unfortunately, it is difficult to maintain control of the magnitude of the improvement realized by incorporating the negative impedance converter in the common communication channel of the instant network because of the wide variations in impedances, filter characteristics, line characteristics, et cetera in the large number of lines connected sequentially in pairs to the common channel. This is particularly evident when the negative impedance is adjusted for near unit gain or lossless transfer.

I have discovered that there is a tendency in the resonant transfer circuit toward sustained oscillation in the presence of the zero loss condition. Measurements indicated that in this instance the oscillation fundamental was one-half the sampling frequency. Therefore, rather than employing the negative impedance converter in a manner so as to prevent oscillations, the converter element is purposely adjusted, in accordance with my invention, to tend to create oscillation within the resonant transfer circuit. Typically, the impedance of the negative impedance converter is established at a level which is greater than the sum of the impedances of any two line gates which may be connected simultaneously to the common channel. The resulting oscillation current increases to a level where the resonant transfer circuit impedance, including that of the line gates, is averaged to zero.

Voice frequency signal samples present in the line capacitance in transferring through the common channel modulate the sustained oscillations in the network. The oscillatory circuit is modified yet zero series impedance is maintained. Thus voice frequency signal samples experience no loss in the transfer between the active pair of lines. The line filter 22 in each line circuit is designed so as to filter out the oscillations produced in the resonant transfer circuit.

It is evident that since the negative impedance converter is only required to possess an impedance value greater than a specific level, with no requirement for adjustment during operation or accurate control, no difficulty is encountered in its design. Nevertheless, employment of such a unit provides a self-adjusting system which permits zero loss in a resonant transfer circuit despite connection thereto at various times of a large number of circuits having different impedance values.

As indicated earlier, in accordance with one aspect of the illustrative embodiment of this invention, the negative impedance converter may be of the series or shunt types, or a combination of the two types, as known in the art, the series type being connected in the common channel, FIG. 3A, the shunt type being connected between the common channel 12 and ground, FIG. 3B, and a specific combination of both being shown in FIG. 3C. In each case provision of a converter having a sufficiently high impedance level to produce oscillation in the resonant transfer circuit will suffice to perform the desired lossless transfer.

FIGS. 4A and 4B depict specific arrangements of the filter circuits to provide adequate suppression of the tendency of the negative impedance converter in the resonant transfer circuit to produce oscillations. As shown in FIG. 4A, the filter comprises capacitor $C_2$ shunting the signal storage capacitance $C_1$ (25) which forms a part of the resonant transfer circuit when the line gate 24 is enabled. Inductor $L_1$ is connected in series with the resonant transfer inductor 26 and the parallel combination of inductor $L_2$ and capacitor $C_3$ is also connected in series with the resonant transfer inductor 26 and the resistive load $R_0$ comprising the telephone subset. For time division systems having a sampling pulse width which is small compared to the sampling period T, this filter configuration in combination with the negative impedance in the resonant transfer circuit permits high return loss and zero decibel insertion loss. Advantageously, a combination of shunt and series converters, as shown in FIG. 3C, comprises the negative impedance in the common channel utilized in conjunction with this filter configuration for optimum performance. Typical constants for the filter are as follows:

$$C_1=\frac{T}{2R_0} \qquad (1)$$

$$L_1=\frac{6TR_0}{\pi^2} \qquad (2)$$

$$C_2=\frac{T}{R_0}\left(\frac{5}{8}-\frac{1-m}{\pi}\right) \qquad (3)$$

$$L_2=\frac{mTR_0}{\pi} \qquad (4)$$

$$C_3=\frac{T}{R_0}\,\frac{1-m^2}{m\pi} \qquad (5)$$

$$m=\sqrt{1-\frac{1}{4T^2f_r^2}} \qquad (6)$$

and $f_r$ is the frequency of maximum rejection of an $m$ derived terminating section for the practical filter. In a typical embodiment with $f_r$ equal to 10 kilocycles, T equal to 80 microseconds and $R_0$ equal to 10,000 ohms, the calculated constants are $C_1=4000$ micromicrofarads, $L_1=485$ millihenrys, $C_2=4450$ micromicrofarads, $L_2=198$ millihenrys, and $C_3=1270$ micromicrofarads.

FIG. 4B illustrates a further modification to include a rejection of the sampling frequency $1/T$ which can be accomplished with only slight degradation of transmission performance. It is noted that this further modification comprises an additional capacitor 46 in shunt with the inductor $L_1$ of FIG. 4A. The actual optimum constant values for the frequency band of interest may differ slightly from the values set forth in regard to the filter of FIG. 4A due to inductor and capacitor losses.

It is to be understood that the above-described arrangements are illustrative of the application of the principles of the invention. Numerous other arrangements may be devised by those skilled in the art without departing from the spirit and scope of the invention.

What is claimed is:

A communication system comprising a plurality of lines each having a load impedance $R_0$, first capacitance means $$\left(C_1=\frac{T}{2R_0}\right)$$

terminating each of said lines, a common link comprising resonant transfer inductance and a negative impedance converter, gating means connecting said lines to said link, means for enabling a pair of said gating means to provide a signal transfer path between the first capacitance means in the corresponding pair of said lines during a time slot interval of duration T in a repetitive cycle of time slots, and filter means in each of said lines for attenuating oscillations produced by said negative impedance converter during signal transfer, said filter means comprising first $$\left(L_1=\frac{6TR_0}{\pi^2}\right)$$

and second $$\left(L_2=\frac{mTR_0}{\pi}\right)$$

inductance means, second capacitance means $$\left[C_2=\frac{T}{R_0}\left(\frac{5}{8}-\frac{1m}{\pi}\right)\right]$$

shunting said signal storage means and third capacitance means $$\left(C_3=\frac{T}{R_0}\frac{1-m^2}{m^{\pi}}\right)$$

shunting said second inductance means wherein $$m=\sqrt{1-\frac{1}{4T^2f_r^2}}$$

$f_r$ being the frequency of maximum rejection of an $m$ derived terminating section.

References Cited by the Examiner

UNITED STATES PATENTS

| | | | |
|---|---|---|---|
| 2,927,967 | 3/60 | Edson | 179—15 |
| 2,936,337 | 5/60 | Lewis | 179—15 |
| 2,936,338 | 5/60 | James et al. | 179—15 |
| 3,061,681 | 10/62 | Richards | 179—15 |
| 3,100,820 | 8/63 | Svala et al. | 179—15 |
| 3,111,557 | 11/63 | Scott et al. | 179—15 |
| 3,117,185 | 1/64 | Adelaar | 179—15 |

FOREIGN PATENTS

| | | |
|---|---|---|
| 221,992 | 6/59 | Australia. |
| 866,653 | 4/61 | Great Britain. |

DAVID G. REDINBAUGH, *Primary Examiner.*